(12) United States Patent
Tomizawa et al.

(10) Patent No.: US 9,066,010 B2
(45) Date of Patent: Jun. 23, 2015

(54) PHOTOGRAPHING APPARATUS, PHOTOGRAPHING METHOD AND MEDIUM RECORDING PHOTOGRAPHING CONTROL PROGRAM

(71) Applicant: OLYMPUS CORPORATION, Shibuya-ku, Tokyo (JP)

(72) Inventors: Masaomi Tomizawa, Hachioji (JP); Osamu Nonaka, Machida (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/270,149

(22) Filed: May 5, 2014

(65) Prior Publication Data

US 2015/0097982 A1    Apr. 9, 2015

(30) Foreign Application Priority Data

Oct. 3, 2013    (JP) .................................. 2013-208357

(51) Int. Cl.
*H04N 5/225* (2006.01)
*H04N 5/232* (2006.01)
*G06T 7/00* (2006.01)
*G06T 7/20* (2006.01)

(52) U.S. Cl.
CPC ............ *H04N 5/23229* (2013.01); *G06T 7/004* (2013.01); *G06T 7/20* (2013.01)

(58) Field of Classification Search
CPC ... H04N 5/23232; H04N 5/247; H04N 5/349; H04N 5/2328; H04N 5/23248; H04N 5/23283; H04N 5/23287; H04N 3/1587

USPC ............... 348/218.1, 219.1, 208.7, 208.12, 348/208.13

See application file for complete search history.

(56) References Cited

U.S. PATENT DOCUMENTS

| 2014/0071131 | A1* | 3/2014 | Kitago ......................... 345/427 |
| 2014/0071313 | A1* | 3/2014 | Hiasa ....................... 348/231.99 |
| 2014/0198230 | A1* | 7/2014 | Tsutsumi .................... 348/218.1 |

FOREIGN PATENT DOCUMENTS

| JP | 09261537 A | * 10/1997 | ............. H04N 5/262 |
| JP | 2005-012660 A | 1/2005 | |
| JP | 2006339903 A | 12/2006 | |
| JP | 2009-064086 A | 3/2009 | |
| JP | 2010273183 A | 12/2010 | |

OTHER PUBLICATIONS

Japanese Office Action dated Jul. 1, 2014 in counterpart Japanese Application No. 2013-208357.

* cited by examiner

*Primary Examiner* — Sinh Tran
*Assistant Examiner* — Zhenzhen Wu
(74) *Attorney, Agent, or Firm* — Holtz, Holtz, Goodman & Chick PC

(57) ABSTRACT

A photographing apparatus includes an image pickup unit that acquires a plurality of picked-up images by picking up images of a subject from mutually different viewpoints, an image comparison section that determines a specific part which is specific in the picked-up images and a part other than the specific part, and an image generating section that generates a special image by performing image processing differently for the specific part and for the part other than the specific part.

11 Claims, 14 Drawing Sheets

43   44a 43   44b

FIG. 12
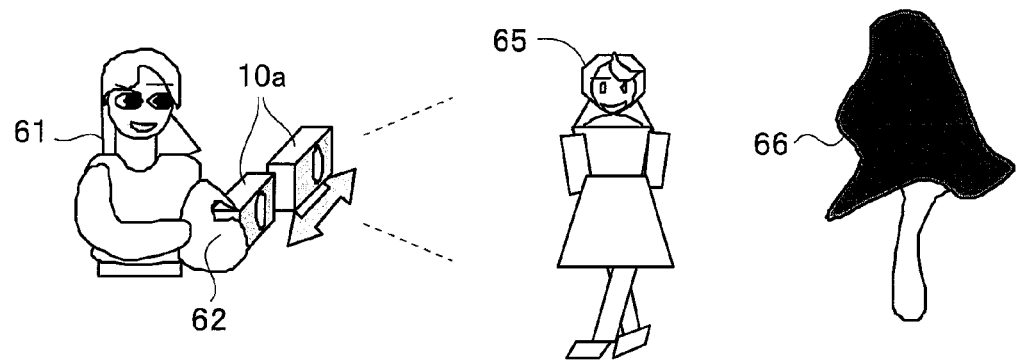
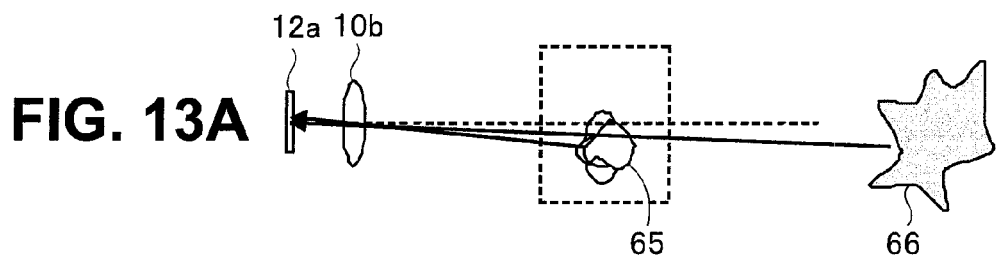
FIG. 13A
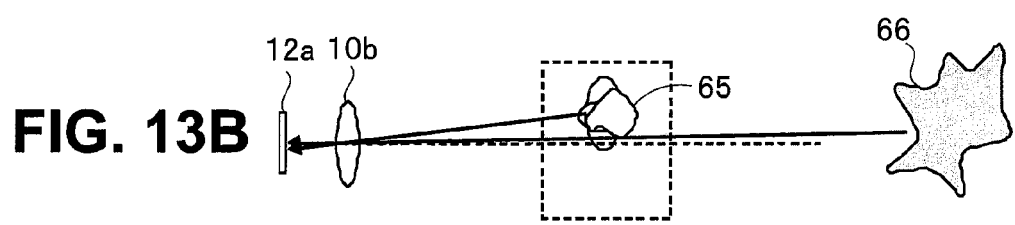
FIG. 13B
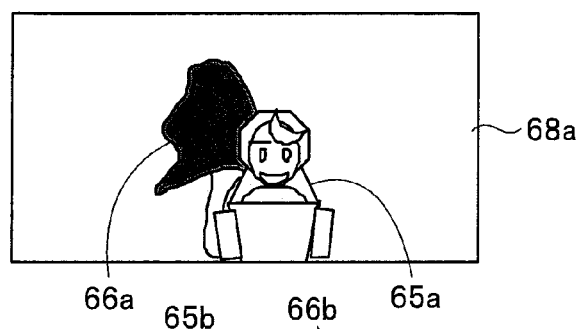
FIG. 13C
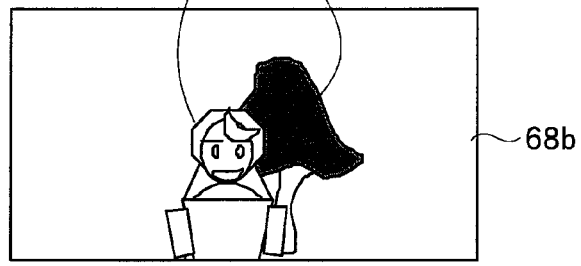
FIG. 13D

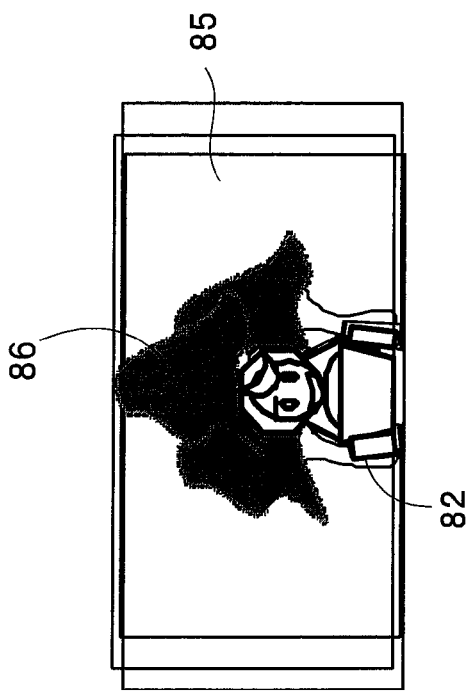
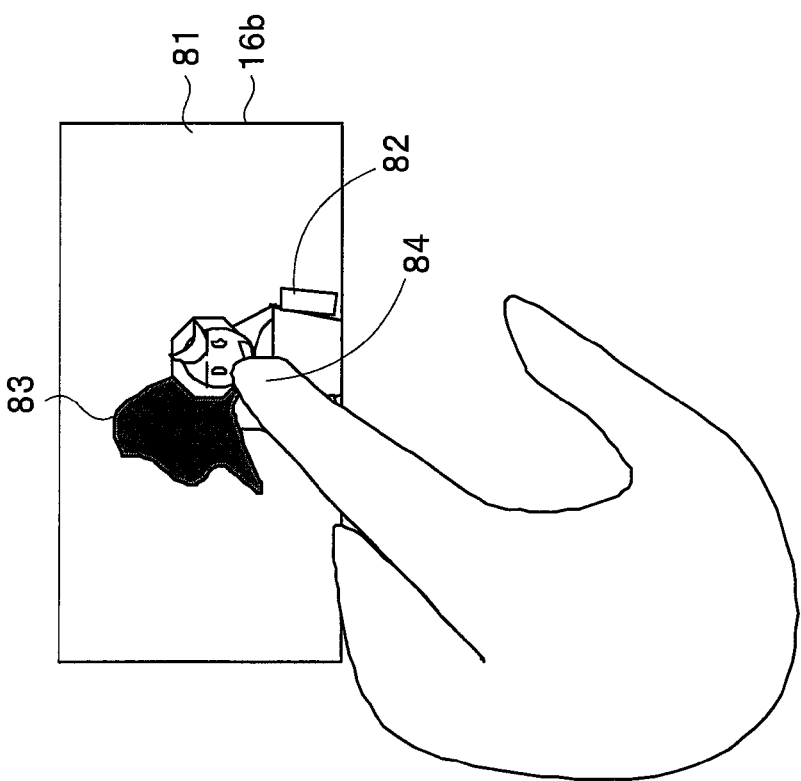
FIG. 17B
FIG. 17A

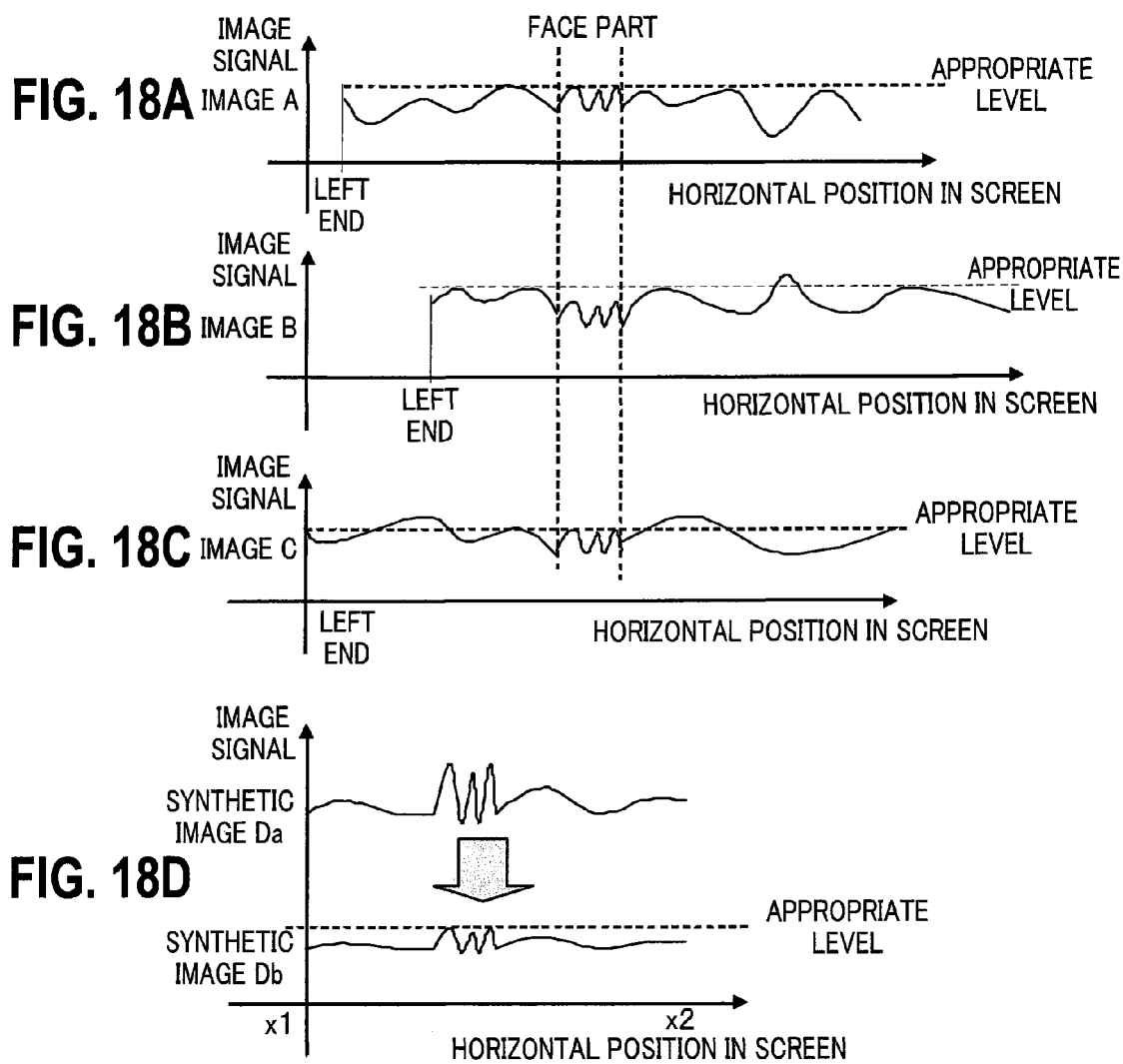

PHOTOGRAPHING APPARATUS, PHOTOGRAPHING METHOD AND MEDIUM RECORDING PHOTOGRAPHING CONTROL PROGRAM

This application claim is benefit of Japanese Application No. 2013-208357 filed in Japan on Oct. 3, 2013, the contents of which are incorporated by this reference.

BACKGROUND OF THE INVENTION

1. Field of the Invention

The present invention relates to a photographing apparatus, a photographing method, and a medium recording a photographing control program which are capable of performing continuous photographing.

2. Description of the Related Art

In recent years, portable apparatuses (photographing apparatuses) with photographing function such as digital cameras become common. Some of these photographing apparatuses have display sections and functions of displaying picked-up images. Further, some of these apparatuses display menu screens on the display sections to make an operation of the photographing apparatus easy.

Further, there has been developed a photographing apparatus provided with a photographing mode in which a predetermined filter effect process is applied to the picked-up image. By performing the predetermined filter effect process on the picked-up image, various image processes for clearly displaying a subject are possible.

For example, in Japanese Patent Laid-Open Publication No. 2009-64086, there is disclosed a proposal of providing an image processing technique capable of enhancing an expressive power of an outline. Further, in Japanese Patent Laid-Open Publication No. 2005-12660, there is disclosed a technique of providing an image generation method and an image generation apparatus for generating an image by automatically removing an unnecessary image from a picked-up image.

SUMMARY OF THE INVENTION

A photographing apparatus according to the present invention includes: an image pickup unit that acquires a plurality of picked-up images by picking up images of a subject from mutually different viewpoints; an image comparison section that determines a specific part which is specific in the picked-up images and a part other than the specific part; and an image generating section that generates a special image by performing image processing differently for the specific part and for the part other than the specific part.

Further, a photographing method according to the present invention includes: an image pickup step of acquiring a plurality of picked-up images by picking up images of a subject from mutually different viewpoints; an image comparing step of determining a specific part which is specific in the picked-up images and a part other than the specific part; and an image generating step of generating a special image by performing image processing differently for the specific part and for the part other than the specific part.

Further, a computer-readable recording medium recording a photographing control program according to the present invention records the photographing control program for executing: an image pickup step of acquiring a plurality of picked-up images by picking up images of a subject from mutually different viewpoints; an image comparing step of determining a specific part which is specific in the picked-up images and a part other than the specific part; and an image generating step of generating a special image by performing image processing differently for the specific part and for the part other than the specific part.

Further, a photographing apparatus according to the present invention includes an image pickup unit, and includes: a mode setting section for setting an emphasis mode for performing emphasis processing for making a target subject conspicuous in a picked-up image; an acquisition section that, when the same target subject is photographed a plurality of times while the photographing apparatus is moved with respect to the target subject so that a viewpoint of the image pickup unit varies with respect to the same target subject in a state where the emphasis mode is set, acquires a plurality of picked-up images including the target subject picked up from different viewpoints; a first synthesizing section that generates a first synthetic image by synthesizing the plurality of images including images of the target subject picked up from the different viewpoints acquired by the acquisition section; a region setting section that sets a region including the plurality target subjects based on the first synthetic image synthesized by the first synthesizing section; a second synthesizing section that generates a second synthetic image by synthesizing the plurality of images including the images of the target subject picked up from the different viewpoints acquired by the acquisition section such that image positions of the target subject coincide with each other; a detecting section that obtains a boundary between the target subject synthesized to coincide with each other and a low contrast part, and detects a region surrounded by the boundary and the region set by the region setting section, as a region to be processed; and an image generating section that generates an image in which the region in the second synthetic image detected by the detecting section is processed.

Further, a photographing apparatus according to the present invention includes: an image pickup unit that picks up an image of a subject and outputs a picked-up image; a display control section for displaying the picked-up image on a display section; a touch panel disposed on the display section: a setting section that detects, in response to an operation on the touch panel for designating an image part of the picked-up image displayed on the display section, one subject out of subjects included in the picked-up images as a target subject, and sets the one subject to be an emphasis region candidate; a range setting section that sets, when the target subject is photographed in different positions within the picked-up images by a plurality of image pickups from different viewpoints of the image pickup unit, one range including all of a plurality of image parts of the target subject included in a first synthetic image obtained by synthesizing the picked-up images; a synthesizing section that obtains a second synthetic image by synthesizing a plurality of picked-up images used in image synthesizing of the first synthetic image such that image positions of the image parts of the target subject coincide with each other; a region setting section that obtains a boundary between the image part of the target subject and other image part based on contrast of respective parts in the second synthetic image and sets the image part of the target subject which is detected as the emphasis region candidate to be an emphasis region, and sets a region other than the emphasis region in the range set by the range setting section to be a processing region; and an image generating section that generates an image in which the processing region in the second synthetic image is processed.

The above and other objects, features and advantages of the invention will become more clearly understood from the following description referring to the accompanying drawings.

BRIEF DESCRIPTION OF THE DRAWINGS

FIG. 12 is an explanatory diagram for explaining a method of separating a target subject from a background;

FIGS. 13A-13D are explanatory diagrams for explaining the method of separating the target subject from the background;

FIGS. 17A and 17B are explanatory diagrams for explaining display in the fourth embodiment; and FIGS. 18A-18D are explanatory diagrams for explaining exposure control.

DETAILED DESCRIPTION OF PREFERRED EMBODIMENTS

Figure 1:
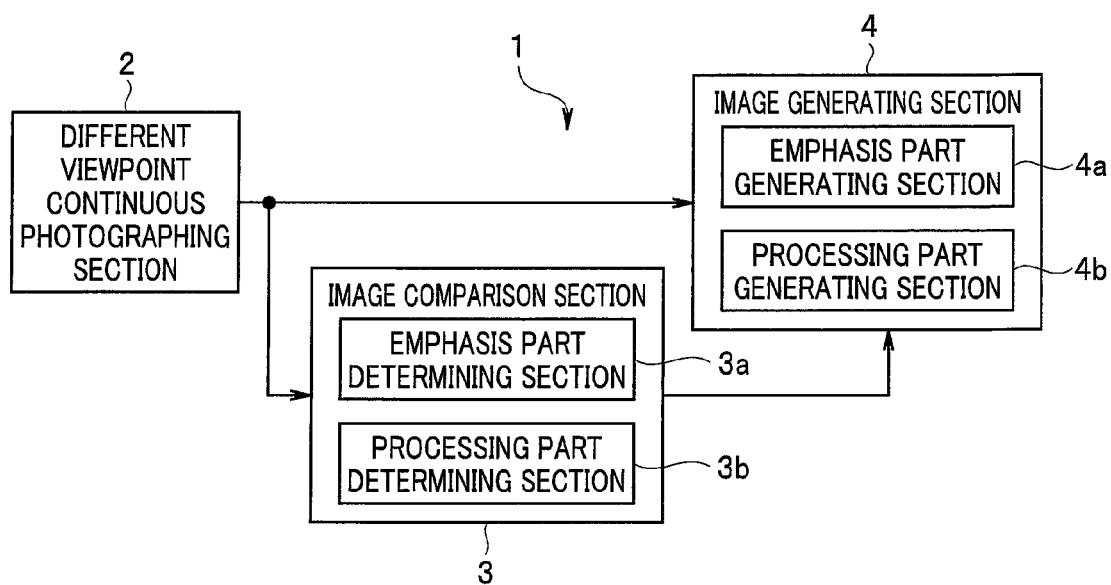
FIG. 1 is a block diagram showing a circuit configuration of a photographing apparatus according to a first embodiment of the present invention.

Hereinafter, embodiments of the present invention will be described in detail referring to the drawings.

First Embodiment

FIG. 1 is a block diagram showing a circuit configuration of a photographing apparatus according to the first embodiment of the present invention. The present embodiment enables image processing for making a target object (target subject) in a picked-up image conspicuous. For example, in the present embodiment, it is possible to perform image processing for surrounding the target subject by a halo and it is made possible to control the image processing by a user's simple operation.

A photographing apparatus 1 according to the present embodiment is constituted by a different-viewpoint continuous photographing section 2, an image comparison section 3 and an image generating section 4. It is configured that the different-viewpoint continuous photographing section 2 can photograph a target subject, which is not shown, from a plurality of different viewpoints. For example, the different-viewpoint continuous photographing section 2 can be config- ured by an image pickup unit having an image pickup device, and it is possible to photograph the target subject a plurality of times from different viewpoints by performing continuous photographing of a plurality of times in a time period while a user moves the image pickup unit with respect to the target subject.

It is noted that the continuous photographing from different viewpoints in the present embodiment is carried out for performing at least one of processes for emphasis part determination, processing part determination, emphasis part generation and processing part generation, as described later.

Picked-up images from the different-viewpoint continuous photographing section 2 are given to the image comparison section 3 and the image generating section 4. The image comparison section 3 is configured by an emphasis part determining section 3a and a processing part determining section 3b. The emphasis part determining section 3a detects an image part of the target subject (hereinafter, referred to as "emphasis part" or "specific part") which is a part to be made conspicuous, from the inputted picked-up images. The emphasis part determining section 3a may be configured to detect the target subject from image features of respective parts of the picked-up images, and may be configured to detect the target subject based on a user's operation. Further, the emphasis part determining section 3a may be configured to detect the target subject using a user's operation for moving the viewpoint, which enables the photographing of the target subject from different viewpoints, in the different-viewpoint continuous photographing section 2.

The processing part determining section 3b determines an image part (hereinafter, referred to as "processing part") where the image processing is performed around the target subject to make the target subject conspicuous. The processing part determining section 3b is provided with information of the emphasis part from the emphasis part determining section 3a and sets the processing part around the emphasis part. The processing part determining section 3b may determine the processing part having a predetermined size and a predetermined shape around the emphasis part. Further, the processing part determining section 3b may determine the processing part based on a user's operation. Furthermore, the processing part determining section 3b may configured to determine the processing part using the user's operation for moving the viewpoint, which enables the photographing of the target subject from different viewpoints, in the different-viewpoint continuous photographing section 2.

The image comparison section 3 outputs information regarding the emphasis part and the processing part to the image generating section 4. The image generating section 4 is configured by an emphasis part generating section 4a and a processing part generating section 4b. The plurality of picked-up images obtained by the continuous photographing are inputted to the image generating section 4 from the different-viewpoint continuous photographing section 2.

The emphasis part generating section 4a generates an image of the emphasis part based on the image part of the target subject in one picked-up image or a plurality of picked-up images out of the inputted picked-up images. For example, the emphasis part generating section 4a may generate the image of the emphasis part from one of the picked-up images, and may generate the image of the emphasis part by synthesizing all the picked-up images such that image positions of the emphasis part coincide with each other.

The processing part generating section 4b generates an image of the processing part. For example, the processing part generating section 4b may set an image prepared in advance to the image of the processing part. Further, the processing part generating section 4b may set a background image around the target subject to the image of the processing part. For example, the image of the processing part may be generated by image processing of the image part around the target subject in one of the picked-up images, and may be generated by synthesizing all the picked-up images such that image positions of the emphasis part coincide with each other.

Figure 2:
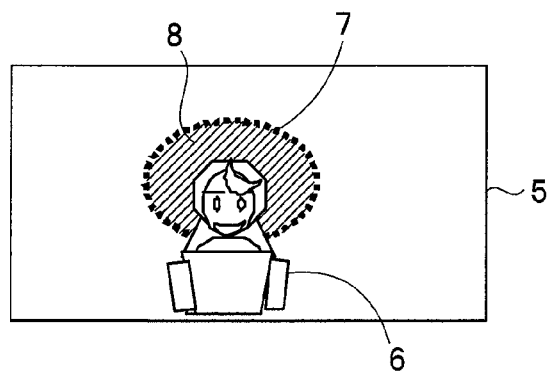
FIG. 2 is an explanatory diagram showing a picked-up image generated in the first embodiment.

Next, an operation in the embodiment having the above configuration is explained referring to FIG. 2. FIG. 2 is an explanatory diagram showing a picked-up image generated in the present embodiment.

The different-viewpoint continuous photographing section 2 performs photographing from a plurality of different viewpoints in a state where the target subject, e.g. a person is captured in a photographing range. For example, the user performs a continuous photographing operation while moving the image pickup unit which constitutes the different-viewpoint continuous photographing section 2, and thereby the target subject is photographed a plurality of times from different viewpoints. The picked-up images from the different-viewpoint continuous photographing section 2 are given to the image comparison section 3 and the image generating section 4.

The emphasis part determining section 3a of the image comparison section 3 detects the emphasis part which is the image part of the target subject. Further, the processing part determining section 3b determines the processing part which is the image part in which the image processing is performed around the target subject.

The emphasis part generating section 4a of the image generating section 4 generates the image of the emphasis part based on the image part of the target subject in one picked-up image or a plurality of picked-up images out of the inputted picked-up images. For example, the emphasis part generating section 4a generates the image of the emphasis part by synthesizing the plurality of picked-up images obtained by the continuous photographing such that image positions of the emphasis part coincide with each other. Further, the processing part generating section 4b generates the image of the processing part. For example, the processing part generating section 4b sets the image prepared in advance to the image of the processing part.

FIG. 2 shows a picked-up image 5 generated by the image generating section 4, as an example in which an image 6 of a person as the target subject is set to the emphasis part. In the periphery of the image 6, e.g. the periphery of a face, a processing part 7 is set and an image 8 of the processing part is generated within a region of the processing part 7.

For example, the image 8 of the processing part 7 shows an appearance of a face part of the image 6 of the person surrounded by a halo, to be a display in which the image 6 of the person, i.e. the emphasis part, is made conspicuous.

As described above, in the present embodiment, the user is allowed to perform photographing in which the target object is made conspicuous by an intuitive operation and simple image processing.

Second Embodiment

Figure 3:
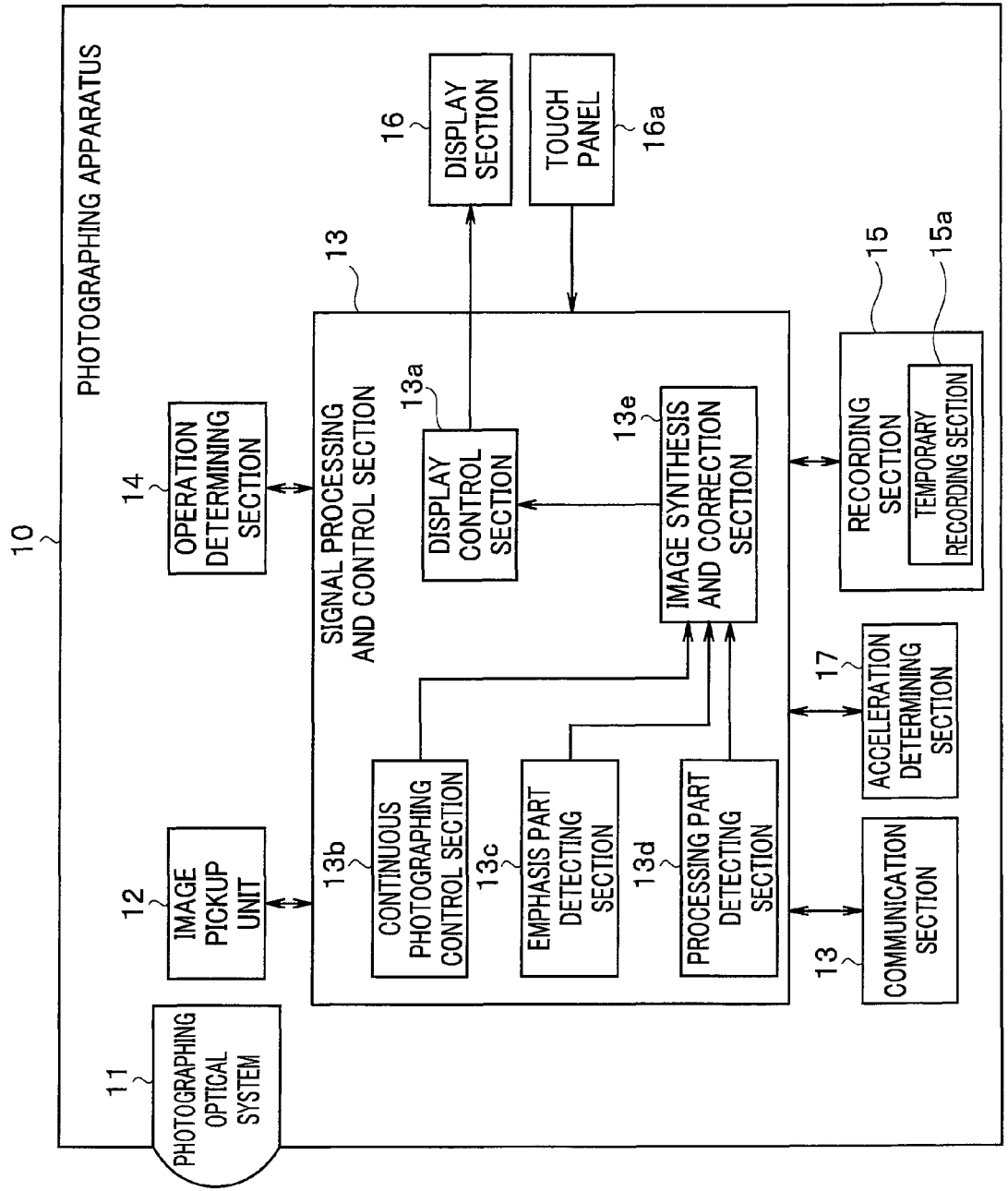
FIG. 3 is a block diagram showing a second embodiment of the present invention.

FIG. 3 is a block diagram showing a second embodiment of the present invention. The present embodiment shows the photographing apparatus of FIG. 1 specifically. The present embodiment shows an example in which processing part determination processing is performed by the continuous photographing from different viewpoints.

A photographing apparatus 10 is provided with a photographing optical system 11 on a front face. The photographing optical system 11 guides a subject image on an image pickup unit 12. The photographing optical system 11 is provided with lenses and the like for zooming and focusing, which are not shown, and it is configured that these lenses are controlled to be driven by a signal processing and control section 13. A focusing point, a zoom position, a diaphragm, etc. of the photographing optical system 11 are controlled by the signal processing and control section 13.

The photographing apparatus 10 includes the image pickup unit 12 configured by an image pickup device such as a CCD and a CMOS sensor. The image pickup unit 12 performs photoelectric conversion of the subject image from the photographing optical system 11 to obtain a picked-up image. The image pickup unit 12 is controlled to be driven by the signal processing and control section 13 and outputs the picked-up image.

The signal processing and control section 13 is configured for example by a CPU and so on which are not shown, and performs camera control according to a program stored in a memory. The signal processing and control section 13 controls a shutter speed, an exposure time, etc. by outputting driving signals for the image pickup device to the image pickup unit 12, and reads out the picked-up image from the image pickup unit 12. The signal processing and control section 13 performs predetermined signal processing, e.g. color adjustment processing, matrix conversion processing, noise removal processing and other various types of signal processing with respect to the read out picked-up image.

An operation determining section 14 is also disposed in the photographing apparatus 10. The operation determining section 14 is configured to generate operation signals based on user's operations on an operation portion including a shutter button, function buttons and various switches and the like for photographing mode setting and the like which are provided on the photographing apparatus 10 and not shown, and output the operation signals to the signal processing and control section 13. The signal processing and control section 13 controls the respective sections based on the operation signals.

The signal processing and control section 13 can perform processing concerning recording and reproduction of the picked-up image. For example, the signal processing and control section 13 can perform compression processing of the picked-up image after the signal processing and give the compressed image to a recording section 15 to be recorded. As the recording section 15, for example, a card interface may be adopted and the recording section 15 can record image information, voice information, etc. in a recording medium such as a memory card.

A display control section 13a of the signal processing and control section 13 executes various types of processing concerning displays. The display control section 13a can give the picked-up image after the signal processing to a display section 16. The display section 16 has a display screen such as an LCD and displays the image given from the display control section 13a. Further, the display control section 13a is configured to be able to display various menu displays and the like on the display screen of the display section 16.

The signal processing and control section 13 can read out the picked-up image recorded in the recording section 15 and perform expansion processing of the read-out image. The display control section 13a can reproduce the recorded image by giving the picked-up image subjected to the expansion processing to the display section 16.

The display section 16 includes a display screen 16b for displaying the picked-up image, as described later. Further, a touch panel 16a is provided on the display screen 16b. The touch panel 16a can generate an operation signal in accordance with a position on the display screen 16b, which the user indicates by a finger. The operation signal is provided to the signal processing and control section 13. Thereby, it is configured that, when the user gives a touch or makes a sliding action on the display screen 16b, the signal processing and control section 13 can detect various operations such as a user's touch position, a user's operation of opening or closing fingers (pinch operation), a user's sliding operation and a position which is reached by the sliding operation, a sliding direction and a time period in which the touch is continued, and can execute processing in response to the user's operation.

Besides, the display section 16 is disposed to occupy an approximately entire region of a back face, for example, of the photographing apparatus 10, and a photographer can confirm a through image displayed on the display screen 16b of the display section 16 when photographing and also perform a photographing operation while confirming the through image.

The photographing apparatus 10 is provided with an acceleration determining section 17. The acceleration determination section 17 is configured by a gyro sensor, an acceleration sensor, etc. and is configured to be capable of detecting motion of a casing that houses the photographing apparatus 10. A determination result of the acceleration determining section 17 is given to the signal processing and control section 13.

The signal processing and control section 13 is provided with a continuous photographing control section 13b. The continuous photographing control section 13b controls a continuous photographing period and a continuous photographing interval and so forth in the image pickup unit 12. For example, the continuous photographing control section 13b may set a period designated by the user as a continuous image pickup period. Further, it is configured that the continuous photographing control section 13b can instruct a start of the continuous photographing to the image pickup unit when a determination result of the acceleration determining section 17 indicating that the user moves the casing of the photographing apparatus 10 is given.

In the present embodiment, the continuous photographing control section 13b is capable of operating in an emphasis mode for obtaining a picked-up image in which the emphasis part is made conspicuous by performing image processing of at least one of the emphasis part such as the target subject and the processing part set around the emphasis part. In order to realize the emphasis mode, the signal processing and control section 13 is configured to give a plurality of picked-up images obtained by the continuous photographing control by the continuous photographing control section 13b to a temporarily recording section 15a of the recording section 15 to temporarily store the images therein.

The signal processing and control section 13 can realize the same function as the image comparison section 3 and the image generating section 4 in the first embodiment. An emphasis part detecting section 13c detects the emphasis part in the picked-up image from the image pickup unit 12, and a processing part detecting section 13d detects the processing part in the picked-up image from the image pickup unit 12.

Figure 4A:
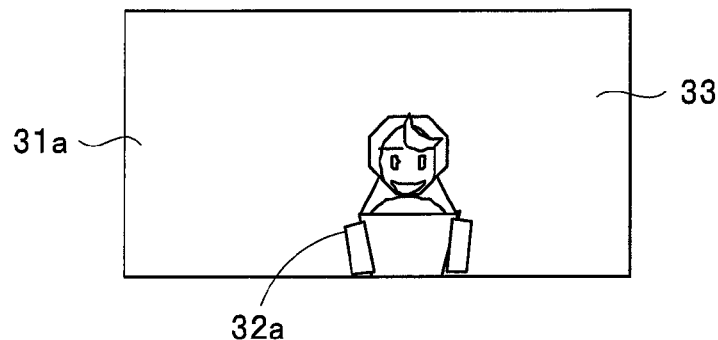
FIGS. 4A and 4B are explanatory diagrams showing two picked-up images 31a and 31b from a different-viewpoint continuous photographing section 2.
Figure 4B:
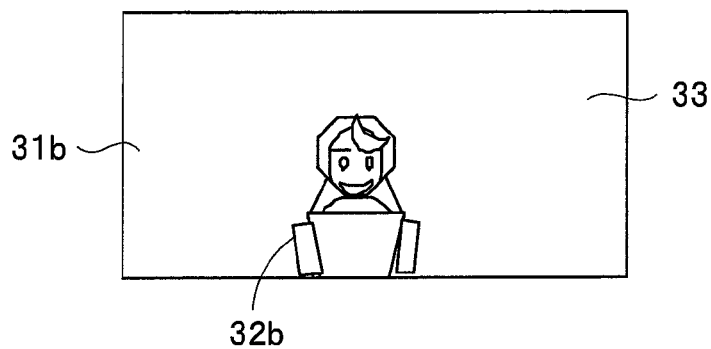

Next, a method of detecting the emphasis part and the processing part in the present embodiment will be described referring to FIGS. 4A and 4B through FIG. 6. FIGS. 4A and 4B show two picked-up images 31a and 31b from different-viewpoint continuous photographing section 2. The picked-up images 31a and 31b are obtained by image pickups directed to the same subject from mutually different viewpoints. The picked-up images 31a and 31b include images 32a and 32b, respectively, obtained by photographing the same person. An image 32a is positioned on a right side of a center of the picked-up image 31a and an image 32b is positioned on a left side of the center of the picked-up image 31a. Further, it is assumed that a background of each of the picked-up images 31a and 31b is a wall painted with one color. Background images 33 in the picked-up images 31a and 31b each have a small contrast change.

Figure 5:
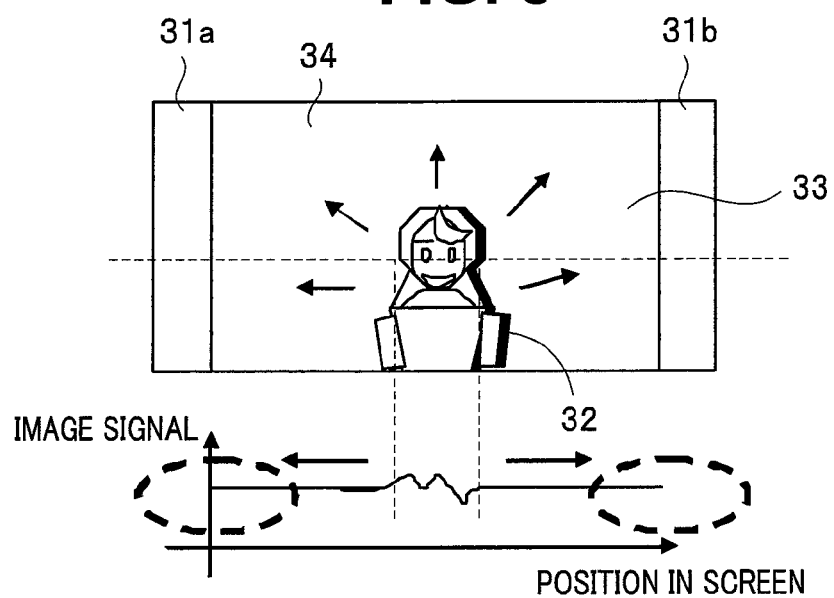
FIG. 5 is an explanatory diagram for explaining the second embodiment.

FIG. 5 shows a synthetic image 34 obtained by synthesizing the images 31a and 31b so that image positions of the image 32a and 32b of FIGS. 4A and 4B coincide with each other, and shows a change of an image signal of an image 32 of the person in the synthetic image 34 at a horizontal position of a face part of the person with a horizontal axis indicating a horizontal position in the screen and with a vertical axis indicating a level of the image signal. As shown in FIG. 5, the image signal at the horizontal position (dotted line) of the face part of the image 32 of the person changes only at the position of the face part, and does not substantially change at other positions (background part).

As described, in the case of the wall or the like where the background has no change in color, it can be determined that a part where a contrast of the image signal is relatively high is the emphasis part which is the target subject and that a part where the contrast of the image signal is sufficiently low is the background. In respective image parts in peripheral directions from the position of the face part of the image 32 as indicated by the arrows, the part where the contrast is sufficiently low (hereinafter, referred to as "low contrast part") is determined and a boundary between the part where the contrast is relatively high and the low contrast part is determined to be a boundary between the target subject and the background.

Besides, the low contrast part may be determined based on whether or not a color in the vicinity of a periphery of the face part where the contrast is relatively large continues to a periphery of the screen. Further, even in a case where there is a part where the contrast is relatively high in peripheral regions of the screen (regions enclosed by the dotted lines, etc.), a part including this part and the part where the contrast is sufficiently low may be determined to be the low contrast part.

Figure 6:
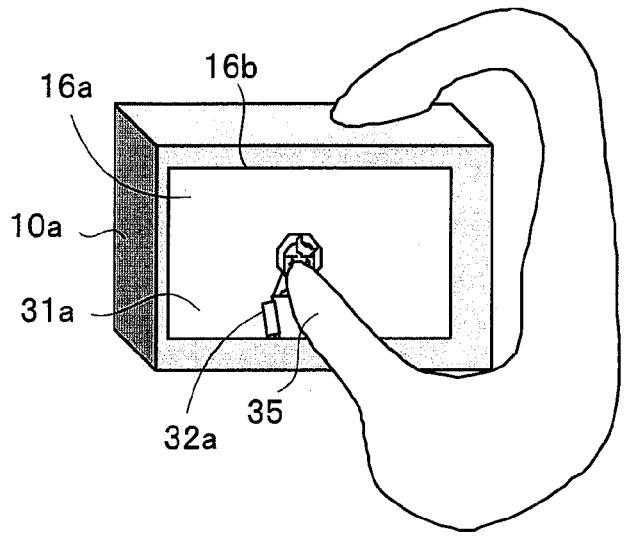
FIG. 6 is an explanatory diagram for explaining an example of a method of designating a target subject.

FIG. 6 is a diagram for explaining an example of a method of designating the target subject. As shown in FIG. 6, the display section 16 having the touch panel 16a on the display screen 16b is provided on the back face of the casing 10a of the photographing apparatus 10. The user can designate the image position of the image 32a by touching the touch panel 16a at a position of the image 32a of the person in the picked-up image 31a displayed on the display screen 16b by a finger 35. The emphasis part detecting section 13c sets a part which the user designates by the touch to the target subject.

Further, the emphasis part detecting section 13c may set the face part detected by a known face detection method to the target subject (emphasis part candidate) without depending on the user's operation, and may set an image at a central part of the screen to the target subject. The emphasis part detecting section 13c and the processing part detecting section 13d obtain the boundary between the emphasis part and the background based on a change of the contrast of the image 32 of the person as target subject in the synthetic image 34 and the contrast around the image 32. The emphasis part detecting section 13c outputs information about the emphasis part obtained by the change of the contrast to an image synthesis and correction section 13e.

The boundary between the emphasis part and the processing part is detected by a change of the contrast. In the present embodiment, the processing part detecting section 13d detects a region outside the processing part by a different-viewpoint continuous photographing operation by the user.

Figure 7:
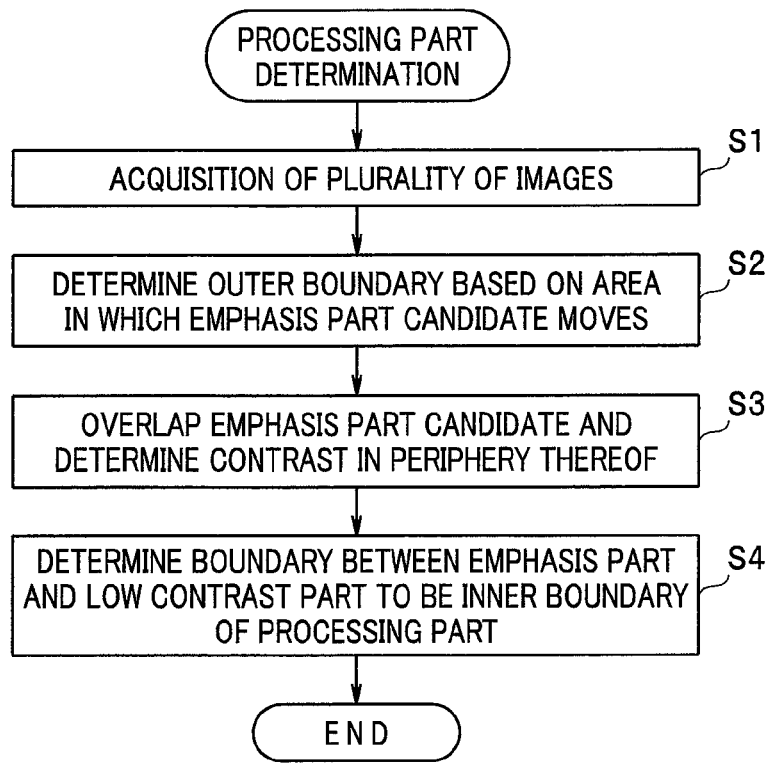
FIG. 7 is a flowchart showing a method of determining a processing part by a processing-part detecting section 13d.

FIG. 7 is a flowchart showing a method of determining the processing part by the processing part detecting section 13d, and FIGS. 8A-8F are explanatory diagrams for explaining the processing part determination method. The processing part detecting section 13d acquires a plurality of images obtained by different-viewpoints continuous photographing control by the continuous photographing control section 13b in Step S1 of FIG. 7. The processing part determining section 3b synthesizes the acquired plurality of images.

Figure 8A:
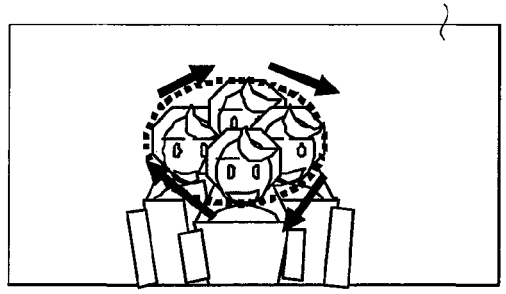
FIGS. 8A-8F are explanatory diagrams for explaining a processing-part determination method.
Figure 8D:
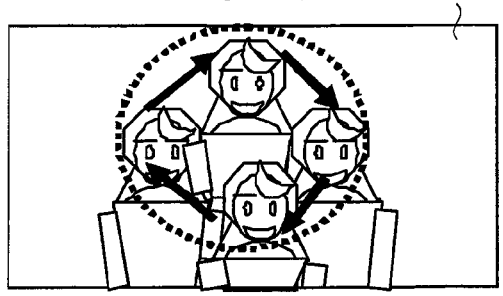
Figure 8B:
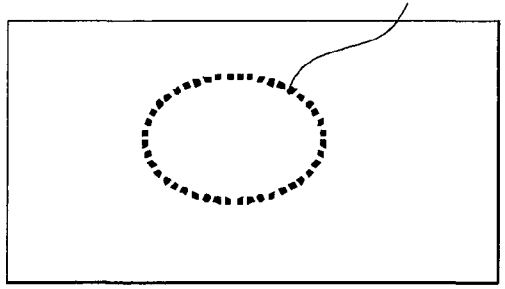
Figure 8E:
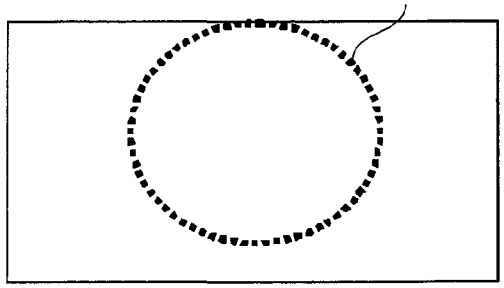

FIGS. 8A and 8D show synthetic images 41a and 41b, respectively, when the target subject is picked up while rotating the photographing apparatus 10 in a state where the person who is the same target subject in the FIGS. 4A and 4B is captured in the photographing range. FIG. 8A shows an example in which an image pickup is performed while the user rotates the photographing apparatus 10 to draw a relatively small circle, and FIG. 8D shows an example in which an image pickup is performed while the user rotates the photographing apparatus 10 to draw a relatively large circle.

More particularly, in FIG. 8A, photographing is performed a plurality of times for face images of the same subject while rotating the image pickup unit so that viewpoints of the image pickup unit differ from each other. Since the viewpoints of the image pickup unit differ from each other, the face images are picked up at displaced positions with respect to the center of the screen, and therefore when the images are synthesized, the synthetic image is obtained as if there are face images of four persons, as shown in FIG. 8A, although the target subject is one.

FIG. 8D is a synthetic image obtained by rotating the image pickup unit to draw a circle larger than the circle in FIG. 8A when photographing a plurality of times while rotating the image pickup unit so that the viewpoints of the image pickup unit differ from each other.

The processing part detecting section 13d includes a region setting section that detects a plurality of face images of the target subject in the synthetic images 41a and 41b by image processing for the synthesized image and determines a region including the face images. That is, the processing part detecting section 13d sets closing lines (dotted lines) 42a and 42b enclosing regions including the target subject (face images) in the synthetic images 41a and 41b, respectively (FIGS. 8B and 8E), and set insides of the set regions to be provisional processing regions. Then, the closing lines 42a and 42b are set to be outer boundaries of the processing regions in which the processing is performed (Step S2). That is, a size of the outer boundary corresponds to a size of a circle along which the user moves the photographing apparatus 10 to draw the circle, for example, when performing the different-viewpoint continuous photographing.

Figure 8C:
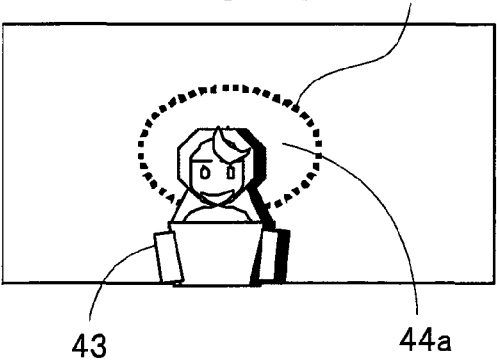
Figure 8F:
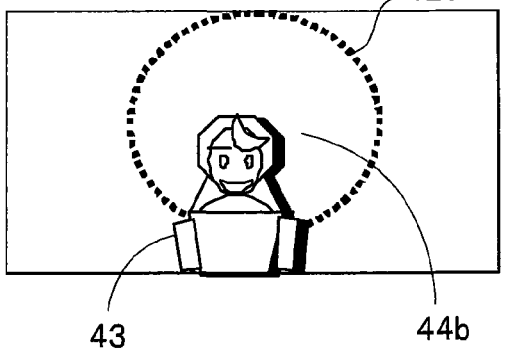

Next, the processing part detecting section 13d synthesizes the images obtained by the different-viewpoint continuous photographing such that image positions of the target subject as the emphasis part candidate coincide with each other, as shown in FIG. 8C. In this synthetic image, a change of the contrast in the emphasis part candidate and its periphery is determined and a boundary between the emphasis part and the low contrast is determined (Step S3). The processing part detecting section 13d sets inside of the boundary between the emphasis part and the low contrast part to an actual processing region within the provisional processing region (Step S4).

Thus, in the example of FIG. 8C, a region enclosed by the closing line 42a and the boundary between the emphasis part 43 as the target subject and the low contrast part is set to the processing part 44a as the region in which the actual processing is performed. Further, in the example of FIG. 8F, a region enclosed by the closing line 42b and the boundary between the emphasis part 43 as the target subject and the low contrast part is set to the processing part 44b in the same manner The image synthesis and correction section 13e generates an image subjected to the actual processing by the processing section 44a. The image synthesis and correction section 13e generates, as an image of the processing part, an image which makes the emphasis part 43 conspicuous, for example an image which gives expression such that the emphasis part 43 is surrounded by a halo in the actual processing region, to make the emphasis part 43 conspicuous.

Figure 9:
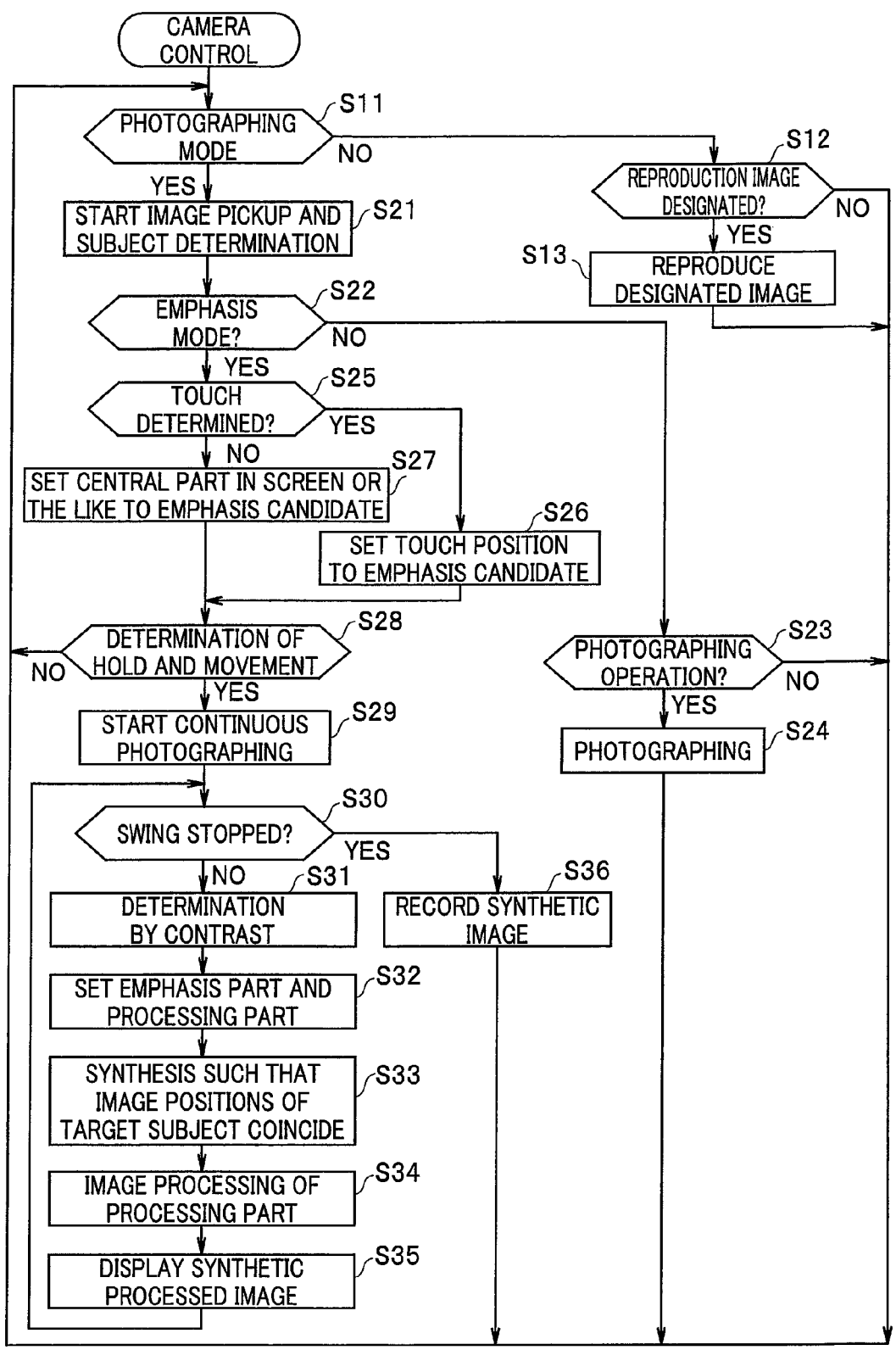
FIG. 9 is a flowchart for explaining an operation in the first embodiment.
Figure 10A:
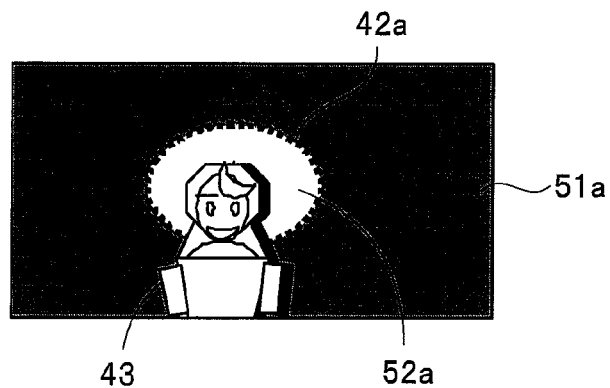
FIGS. 10A and 10B are explanatory diagrams showing picked-up images obtained by the second embodiment.
Figure 10B:
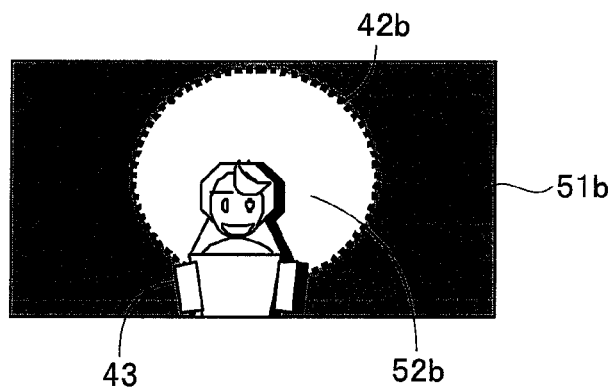

Next, an operation of the embodiment thus configured will be described referring to FIGS. 9, 10A and 10B. FIG. 9 is a flowchart for explaining the operation of the first embodiment and shows camera control. Further, FIGS. 10A and 10B are explanatory diagrams showing picked-up images obtained by the second embodiment.

When a power of the photographing apparatus is turned on, the signal processing and control section 13 determines whether or not a photographing mode is instructed, in Step S1 of FIG. 9. If the photographing mode is not instructed, the signal processing and control section 13 determines whether or not an image to be reproduced is designated, in Step S12. When the image to be reproduced is designated, the signal processing and control section 13 performs reproduction of the image designated, in Step S13.

When the photographing mode is instructed, the signal processing and control section 13 makes the image pickup unit 12 to start an image pickup and starts determination of the subject, in Step S21. The signal processing and control section 13 performs the predetermined image processing of the picked-up image from the image pickup unit 12. The display control section 13a gives the picked-up image after being subjected to the image processing to the display section 16 to display a through image.

Next, the signal processing and control section 13 determines whether or not the emphasis mode is designated (Step S22). If the emphasis mode is not designated, photographing is performed in the normal mode. That is, in Step 23, the signal processing and control section 13 determines whether or not a release operation, a touch operation or the like for photographing is performed (Step S23). When the release operation or the like is performed, the signal processing and control section 13 performs photographing and gives an picked-up image to the recording section 15 to be recorded (Step S24).

If the emphasis mode is instructed, it is determined in Step S25 whether or not a touch operation for designating the emphasis part is performed. When the touch operation for designating the emphasis part is performed, the emphasis part detecting section 13c sets the part designated by the touch operation to be the emphasis part candidate (Step S26). Further, when the touch operation for designating the emphasis part is not performed, the emphasis part detecting section 13c sets the predetermined region to be the emphasis part candidate. For example, the emphasis part detecting section 13c sets the face part at the center of the screen, the central portion of the screen or the like to be the emphasis part candidate. Besides, it may be configured such that the emphasis part detecting section 13c sets the emphasis part candidate only once after detecting that the user holds the photographing apparatus 10 to be directed to the subject by a determination result of the acceleration determination section 17, in order to prevent an undesired subject from being set to the emphasis part candidate by movement of the photographing apparatus.

Next, in Step S28, the continuous photographing control section 13b determines whether or not a user's instruction operation for starting the image pickup unit 12 performing the continuous photographing is performed. For example, the continuous photographing control section 13b may determine that the instruction for starting the continuous photographing to the image pickup unit is issued when it is detected that the user performs an operation of moving the photographing apparatus after assuming a posture of holding based on a determination result of the acceleration determination section 17 or image analysis. For example, the continuous photographing control section 13b can determine a state of holding the photographing apparatus to be direct to the subject when a state of photographing the subject is continued for a predetermined time without causing a camera shake.

Further, the continuous photographing control section 13b may determine that the instruction for starting the continuous photographing is issued to the image pickup unit not only by automatically starting the continuous photographing based on the holding and movement determination but also by detecting that the user performs the release operation manually. Besides, it may be configured that the continuous photographing is started immediately after the emphasis mode by omitting the determination of the instruction for starting the continuous photographing in Step S28.

When the continuous photographing control section 13b determines that the continuous photographing instruction by the user is issued, the continuous photographing control section 13b gives the continuous photographing instruction to the image pickup unit 12, in Step S29. Thereupon, the image pickup unit 12 performs the continuous photographing at predetermined intervals. In the continuous photographing period, the user moves the photographing apparatus 10, and the continuous photographing of the target subject from different viewpoints is performed. The signal processing and control section 13 performs the predetermined signal processing with respect to the picked-up images which are sequentially obtained by the continuous photographing and then gives the images to the temporarily recording section 15a to be recorded.

Next, in Step S30, the continuous photographing control section 13b determines whether or not an instruction by the user for terminating the continuous photographing is issued. For example, the continuous photographing control section 13b may determine that the instruction for terminating the continuous photographing is issued when it is detected that the user operates to stop swing (movement) of the photographing apparatus by a determination result of the acceleration determining section 17 or the like. The continuous photographing control section 13b may determine that the instruction for terminating the continuous photographing is issued by detecting the release operation by the user.

The processing of Steps S31-S35 is repeated until the instruction for terminating the continuous photographing is issued. That is, in Step 31, the emphasis part and the processing part are set. The signal processing and control section 13 obtains the low contrast part by determining the contrast of the emphasis part candidate and the peripheries thereof and set the low contrast part to be an inner boundary of the processing part. Further, the outer boundary of the processing part is obtained based on the region of movement of the photographing apparatus by the user. The processing part detecting section 13d sets the region surrounded by the inner boundary and the outer boundary to be the processing part. Further, the emphasis part detecting section 13c sets the emphasis part by determining a region of the emphasis part by the boundary between the emphasis part candidate and the low contrast part.

The image synthesis and correction section 13e synthesizes the picked-up images so that image positions of the target subject coincide with each other each time when the picked-up image is inputted by the continuous photographing (Step S33). Further, the image synthesis and correction section 13e performs the image processing of the processing part for making the emphasis part conspicuous (Step S34). The image synthesis and correction section 13e gives the synthetic image to the display control section 13a to be displayed on the display section 16 (Step S35).

The processing of Steps S31-S35 is repeated until the instruction for terminating the continuous photographing is issued, so that the images of the emphasis part and the processing part are generated. When the instruction for terminating the continuous photographing is issued, the continuous photographing control section 13b instructs the image pickup unit 12 to terminate the continuous photographing. Thereby, the image synthesis and correction section 13e gives the image that has synthesized to the recording section 15 to be recorded (Step S36).

FIGS. 10A and 10B each shows one example of a picked-up image thus obtained. The emphasis part set by the emphasis part detecting section 13c is emphasized by the image synthesizing, and the processing part set by the processing part detecting section 13d is subjected to the image processing for making the emphasis part conspicuous.

FIG. 10A shows a picked-up image 51a when the user performs the continuous photographing while drawing a relatively small circle, FIG. 10B shows a picked-up image 51b when the user performs the continuous photographing while drawing a relatively large circle. The picked-up image 51a shows that a processing part 52a having a size and a shape based on the user's operation is formed around the emphasis part 43 which is the target subject, and that the image processing is performed in the processing part 52a. Also, the picked-up image 51b shows that a processing part 52b having a size and a shape based on the user's operation is formed around the emphasis part 43 which is the target subject, and that the image processing is performed in the processing part 52b.

That is, the user can start the continuous photographing and set the region of the processing part by the simple operation of rotating the photographing apparatus to draw a circle, for example, with respect to the target subject in a state where the target subject is captured in the photographing range. In the continuous photographing period, the emphasis part (specific part) which is the target subject is emphasized, and in the processing part, the image processing for making the emphasis part conspicuous is performed. The synthetic image from the image synthesis and correction section in the continuous photographing period is displayed on the display screen of the display section 16 by the display control section, and the user can perform the continuous photographing operation while confirming what synthetic image is obtained by the user's town operation.

As described, in the present embodiment, it is possible to emphasize the target subject and set the processing part having the size and the shape in accordance with the user's operation of rotating the photographing apparatus around the target subject and to perform the image processing of the processing part for making the target subject conspicuous by the simple operation by the user to rotate the photographing apparatus, for example. Thus, it is possible to perform the photographing with the target subject made conspicuous by an intuitive operation and simple image processing.

Besides, in the example of FIG. 9, an example of performing the image processing of the processing part each time when the picked-up image is obtained by the continuous photographing is shown, it may be configured such that the image processing is performed with respect to only the picked-up image which is obtained first in the continuous photographing.

Third Embodiment

Figure 11:
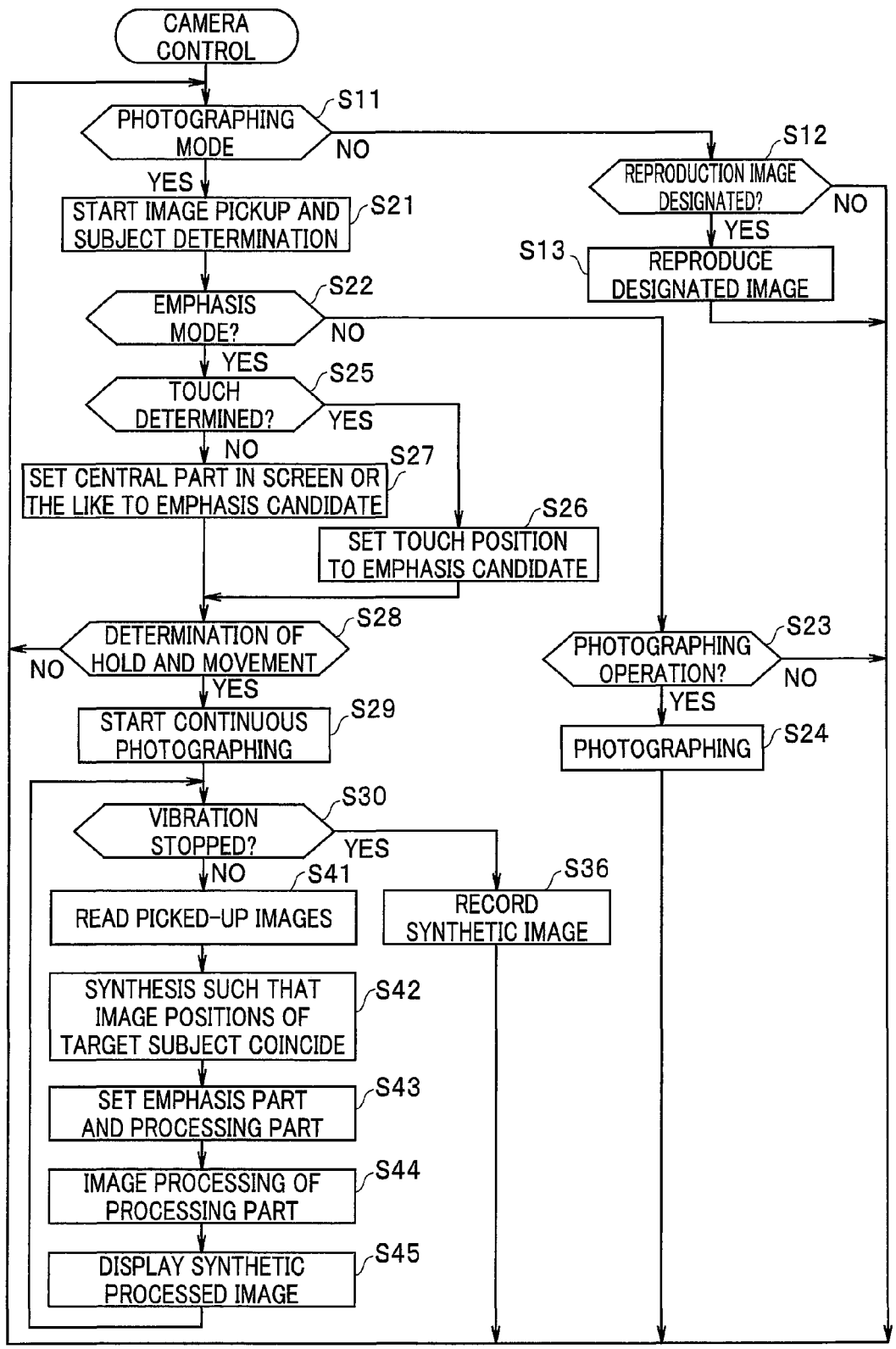
FIG. 11 is a flowchart showing an operation flow adopted in a third embodiment of the present invention.

FIG. 11 is a flowchart showing an operation flow adopted in the third embodiment of the present invention. In FIG. 11, the same reference sign in FIG. 9 is assigned to the same procedure as that in FIG. 9, and the description thereof is omitted. The hardware configuration of the present embodiment is the same as the second embodiment.

In the second embodiment, it is configured that the emphasis part as the target subject and the background can be separated by obtaining the boundary between the portion of relatively high contrast and the low contrast part with respect to the emphasis part candidate and its periphery, assuming that the background is a uniform image such as the wall. However, if the contrast of the background of the target subject is relatively high, the target subject and the background cannot be separated by the comparison of the contrasts.

Therefore, in the present embodiment, it is configured that the separation of the emphasis part as the target subject and the background is performed using the operation of moving the photographing apparatus for the different-viewpoint continuous photographing (different-viewpoint continuous photographing operation).

FIGS. 12 and 13A-13D are explanatory diagrams for explaining a separation method between the target subject and the background. FIG. 12 shows a situation in which a user performs the different-viewpoint continuous photographing operation. As shown in FIG. 12, a user 61 performs photographing by the continuous photographing while moving the photographing apparatus 10 in right and left directions as shown by the arrow in a state where the user grasps a casing 10a of the photographing apparatus by a hand 62 and capture a target subject 65 of a person within the photographing range. In the example of FIG. 12, a tree 66 stands in the background of the target subject 65.

FIGS. 13A and 13B show optical positional relation among a lens 10b, the target subject 65 and the tree 66 as the background in the example of FIG. 12, and FIGS. 13C and 13D show picked-up images in the states of FIGS. 13A and 13B, respectively. In FIGS. 13A and 13B, the dotted straight line shows an optical axis and the rigid arrows show states of incidence of rays of light from the target subject 65 and the tree 66 on an image pickup surface 12a of the image pickup device through the lens 10b.

FIG. 13A shows a case of holding the photographing apparatus 10 to be directed to the left side of the subject and shows that the light from the tree 66 enters the lens 10b from the left side of the light from the target subject 65. Further, FIG. 13B shows a case of holding the photographing apparatus 10 to be directed to the right side of the subject and shows that the light from the tree 66 enters the lens 10b from the right side of the light from the target subject 65. The photographing from different viewpoints is performed by performing photographing while the user moves the photographing apparatus 10 right and left, and change of positions of the images of the target subject 65 and the tree 66 as the background in the picked-up image is caused by a parallax of the photographing in accordance with a distance between the target subject 65 and the tree which is the background.

FIG. 13C shows a picked-up image 68a, corresponding to FIG. 13A, in which an image 66a of the tree 66 which is the background is displayed on the left side of an image 65a of the target subject 65. Further, FIG. 13D shows a picked-up image 68b, corresponding to FIG. 13B, in which an image 66b of the tree 66 which is the background is displayed on the right side of an image 65b of the target subject 65.

Thus, the image position of the background is changed with respect to the target subject as a reference in the images obtained by the different-viewpoint continuous photographing. Therefore, with respect to the plurality of picked-up images obtained by the different-viewpoint continuous photographing, when a synthetic image is generated such that the image positions of the target subject coincide with each other, the target subject is emphasized since the target subject is the same image whereas the background is synthesized as different images since the image positions of the background are changed, so that the background part becomes an image in which contours are blurred, an image having no shapes or the like. Thereby, it is possible to separate the target subject part and the background part and to make a display in which the target subject is emphasized and the background is made unclear so that the target subject is made conspicuous by the background.

In the present embodiment, it is configured that the above synthetic image of the background is used as the processing part to be displayed around the emphasis part which is the target subject portion. A pattern of the background changes in accordance with a movement range of the photographing apparatus by the user for the different-viewpoint continuous photographing, and the user can form the processing part while confirming the change of the pattern generated during the movement of the photographing apparatus. In the processing part, an image is formed such that the shape is lost and the background becomes hazy by the synthesizing to be expedient in making the emphasis part conspicuous.

FIGS. 14A-14E are explanatory diagrams showing a synthetic image generated in the present embodiment. The flow of FIG. 11 differs from the flow of FIG. 9 only in processing from a start to an end of the continuous photographing. In a period from the start to the end of the continuous photographing, the processing of Steps S41-S45 is repeated. That is, in Step S41, reading out of one picked-up image or a plurality of picked-up images stored in the temporary recording section 15a is performed. Next, the image synthesis and correction section 13e synthesizes the read-out images in a state where the positions of the images of the candidate of the emphasis part which is the target subject coincide with each other (Step S42). It is noted that the synthesizing of the synthetic image obtained by the previous synthesis processing and newly read-out image is performed in the second and subsequent image synthesizing.

Figure 14A:
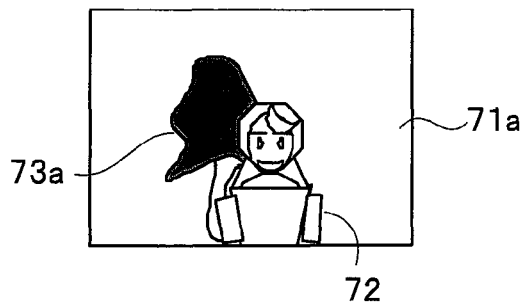
FIGS. 14A-14E are explanatory diagrams showing synthetic images generated in the third embodiment.
Figure 14B:
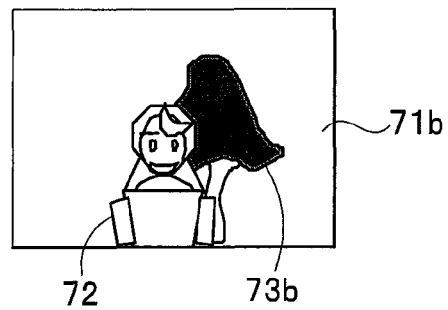
Figure 14C:
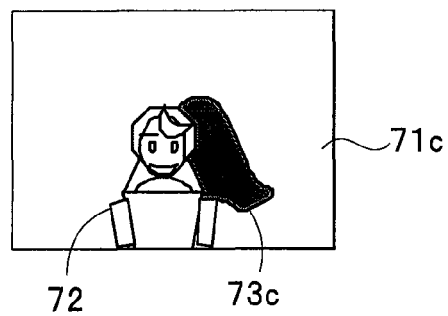

FIGS. 14A through 14C show three picked-up images 71a-71c by the continuous photographing. Since these picked-up images 71a-71c are picked up from different viewpoints, positions of images 73a-73c of the tree which is the background are mutually different in the picked-up images with an image 72 of the person who is the target subject as a reference. It is noted that the picked-up images 71a-71c are obtained by moving the photographing apparatus not only in right and left directions but also in up and down directions.

In the synthesizing processing, the part of the target subject which is the same image is synthesized to be superimposed at the same image position as the emphasis part (a designated-part image or a specific-part image). Thereby, the target subject and the background are separated and the emphasis part and the processing part are determined, and the emphasis part (the designated-part image or the specific-part image) is processed to be emphasized (Step S43). The wording of the emphasis is used to mean superimposing the images to eliminate a blur, superimposing the images to make the exposure appropriate or be a specific value, but the emphasis may be increasing of the contrast or the chroma, or giving an auxiliary image effect. As a matter of course, it is not essential to superimpose the images. In this case, processing in which an appropriate image obtained in advance is superimposed later may be used.

Figure 14D:
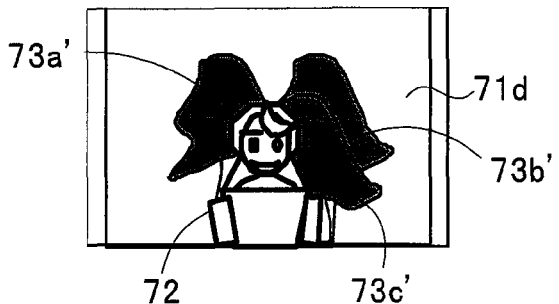

FIG. 14D shows a picked-up image 71d obtained by synthesizing these picked-up images 71a-71c. The picked-up image 71d is obtained by performing synthesizing in a state where the image positions of the images 72 of the target subject coincide with each other, and synthesized images 73a'-73c' of the tree are displayed at mutually different positions. The images 72 of the target subject have image positions which coincide with each other and are emphasized.

On the other hand, in the processing part which is the background part, positions of images 73a'-73c' of the tree are mutually different, and the images 73a'-73c' are arranged around the image 72 of the target subject and changed to an image to give an impression that the target subject is surrounded by a halo (Step S44). A principle that relative positions of the background part are changed under the influence of the parallax when the same image part is superimposed, and thus the background part cannot be synthesized to be overlapped is used. In the overlapped part, there is neither an exposure nor a blur, but in the part not overlapped an image with an inappropriate exposure and a blur is formed. It may be configured to detect the region having such feature based on a motion vector or image comparison. The portion thus determined can be referred to as an image other than the specific part. That is, the image processing here is processing of the image other than the specific part in accordance with a tendency of the image change by the photographing from mutually different viewpoints. The background is naturally separated by the photographing from different viewpoints. However, in a case where there is not any contrast in the background, the background determination is difficult and therefore it may be assisted using movement information of the camera or the like and a tendency of movement of other part.

Figure 14E:
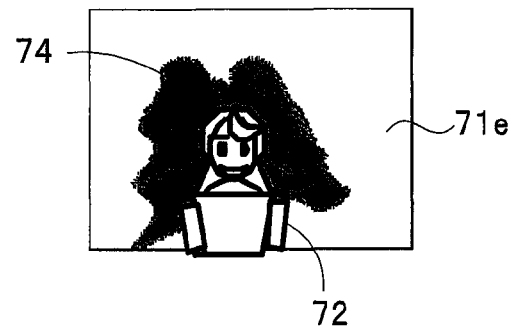

In Step S45, the synthetic image is given to the display section 16 and displayed. Thereafter, until the instruction for terminating the continuous photographing is issued, Steps S41-S45 are repeated. While the user performs the different-viewpoint continuous photographing by moving the photographing apparatus 10, the user can confirm the synthetic image obtained thereby on the display screen 16b of the display section 16. FIG. 14E shows a synthetic image 71e finally obtained as a result of the different-viewpoint continuous photographing. In the synthetic image 71e, an image 74 is formed around the image 72 of the target subject so as to give an impression of a halo by gathered images of the tree.

Besides, in Step S44, it is described that the processing part is obtained by merely synthesizing the image of the background, but it is possible to make the target subject more conspicuous by performing predetermined image processing (which would be conspicuous processing if different from the processing for the emphasis part or specific part).

Figure 15A:
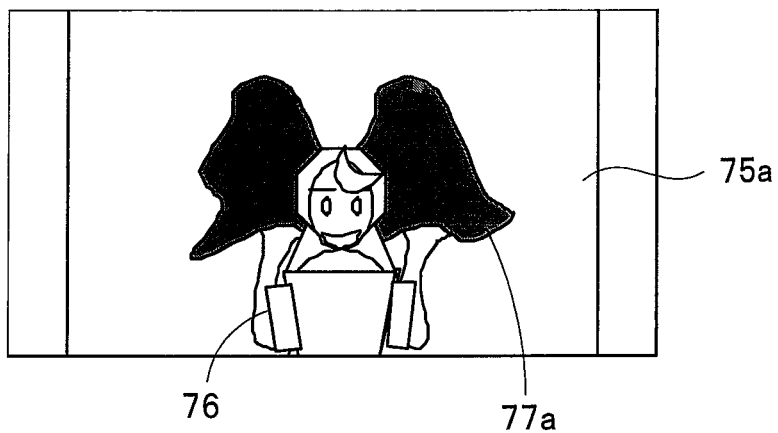
FIGS. 15A and 15B are explanatory diagrams showing an example of processing.
Figure 15B:
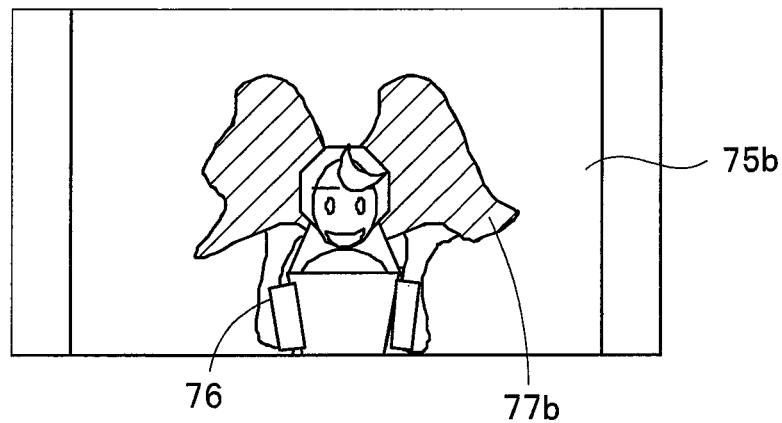

FIGS. 15A and 15B are explanatory diagrams showing an example of the processing in this case. A picked-up image 75a shown in FIG. 15A is an image obtained merely by the synthesizing, and an emphasis part (specific part) 76 which is the target subject is emphasized by the image synthesis and the background constitutes the processing part as being synthesized in a state where the image positions are changed. An image 77a of the tree in the processing part is obtained by synthesizing the original picked-up images. On the other hand, in a picked-up image 75b shown in FIG. 15B, an image 77b of the tree in the processing part is subjected to image processing by the image synthesis and correction section 13e. It is noted that oblique lines in FIGS. 15A and 15B show different images by difference in hatching intervals, and for example, the image 77b of the tree is generated by setting the luminance or chroma of the image to be higher to make it possible to enhance the impression of the halo in the processing part.

Further, the processing may be performed only for the emphasis part which is the target subject and different processing may be performed for the emphasis part and also the processing part. Further, in the same manner as the second embodiment, it may be configured that a processing part having a predetermined shape and a predetermined size is set at a predetermined position around the emphasis part, and an arbitrary image which is unrelated with the original picked-up images is pasted at the set processing part.

As described, in the present embodiment, by the simple operation of rotating the photographing apparatus by the user, it is possible to emphasize the target subject and generate the processing part of the pattern in accordance with the user's rotating operation of the photographing apparatus around the target subject and it is possible to make the target subject conspicuous by the processing part. Thus, the photographing for making the target subject (the designated part image or the specific part image) conspicuous is possible by the intuitive operation and the simple image processing. The rotation may be detected from the change of the image or may be determined, using the sensor that detects movement of the camera itself such as the acceleration sensor, from an output of the sensor.

Fourth Embodiment

Figure 16:
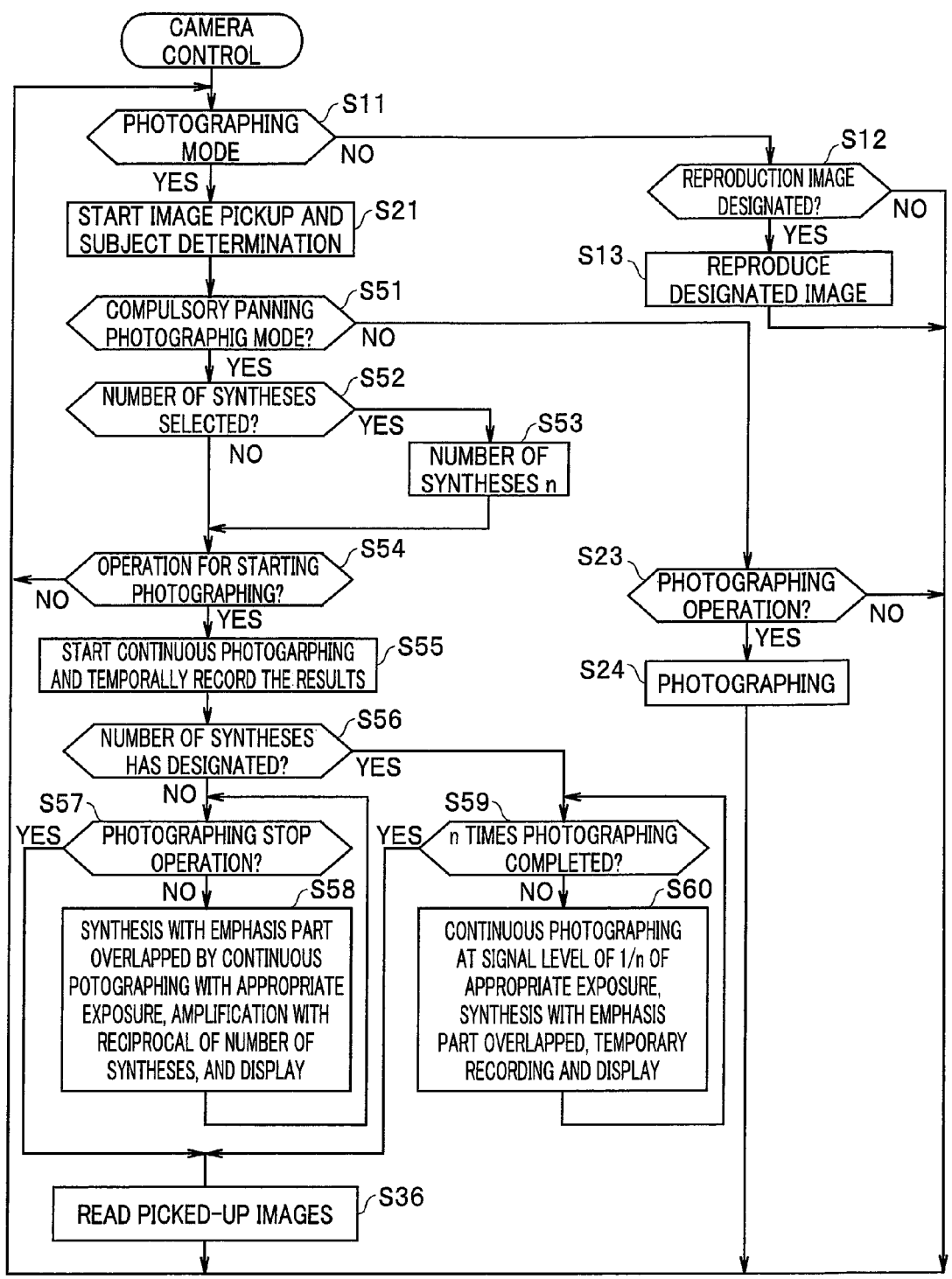
FIG. 16 is a flowchart showing an operation flow adopted in a fourth embodiment of the present invention.

FIG. 16 is a flowchart showing an operation flow adopted in the fourth embodiment of the present invention. In FIGS. 14A-14E, the same reference sign is assigned to the same procedure as that in FIG. 9 and the description thereof is omitted. The hardware configuration of the present embodiment is the same as that of the second embodiment.

In the second and third embodiments, it is possible that the synthetic image synthesized by the image synthesis and correction section 13e is given to the display section 16 to be displayed. Further, the present embodiment enables displaying of the synthetic image not only when generating the synthetic image but also when displaying the through image.

FIGS. 17A and 17B are explanatory diagram for explaining display in the present embodiment, and FIGS. 18A-18D are explanatory diagrams for explaining exposure control.

FIGS. 17A and 17B show through image displays when performing the photographing of FIG. 12. On the display screen 16b of the display section 16, a picked-up image 81 is displayed. In the picked-up image 81, an image 82 of the target subject 65 of the person is displayed at a center and an image 83 of the tree 66 is displayed in the vicinity of the image 82. Here, the user touches the touch panel 16a disposed on the display screen 16b and thereby the emphasis part detecting section 13c can set the image 82 of the person to be the emphasis part candidate.

In the present embodiment, when a compulsory panning photographing mode as described later is designated in the state of displaying the through image, the through image thereafter is displayed with the position of the background displaced in the state where the emphasis part is arranged at the image position at the time of touching or at the central portion of the screen. Further, by recording the picked-up images obtained by the continuous photographing for the through image display in the temporary recording section 15a for a predetermined time and performing the image synthesis with the position of the emphasis part fixed and then displaying the synthesized image, it is possible to display a picked-up image shown in FIG. 17B by the image synthesis and correction section 13e. A picked-up image 85 of FIG. 17B is obtained by synthesizing the picked-up images with the position of the image 82 with the emphasis part being fixed, and a synthetic tree image 86 by a plurality of images of the tree 66 is displayed in the background.

The above photographing method is a photographing method such that the background moves with the target subject fixed like a so-called "panning photographing", but motion of the target subject is followed in the case of "panning photographing" whereas the photographing method in this mode is characterized in that the photographer moves the target subject (emphasis part) image relative to the background utilizing the parallax. It can be said as, so to speak, "compulsory panning photographing". Similarly to the "panning photographing" that produces a different image expression of the background (other than the specific target subject) by following the moving specific subject, according to the present invention also, the specific subject is expressed differently from the other, and like the manner that an effect changes in dependence on a direction of movement of the subject in the panning photographing, it is made possible in the above image processing that the image other than that of the specific part is processed in accordance with tendency of image change by the photographing from mutually different viewpoints.

In this case, it is necessary to make the display appear even by performing control for maintaining the same exposure even when the number of picked-up images successively increases from the first one. Therefore, in the present embodiment, the image synthesis and correction section 13e performs exposure control shown in FIGS. 18A-18D, when recording or synthesizing the continuously photographed images sequentially recorded in the temporary recording section 15a.

FIGS. 18A-18D show three picked-up images photographed for through images and a synthetic image thereof with a horizontal axis indicating a horizontal position in the screen and with a vertical axis indicating an image signal. FIGS. 18A-18C show image signals of images A-C, respectively, and FIG. 13D shows an image signal of the synthetic image. It is noted that the same exposure control as shown in FIGS. 18A-18D is performed in the above-described embodiments.

Waveforms at a position of a face part shown in each of FIGS. 18A through 18C show image pickup results of the face part of the same person. As shown in FIGS. 18A through 18C, horizontal positions of the face part are different from each other. In the present embodiment, the synthesis is performed in a state where the positions of the face part as the emphasis part are set to coincide with each other. In this case, when the image signals of appropriate levels shown in FIGS. 18A through 18C are added together, a synthetic image Da having a level higher than the appropriate level is obtained as shown in FIG. 18D. An image signal Db having the appropriate level is obtained by multiplying the level of the synthetic image Da by ⅓.

Further, when the number of picked-up images to be synthesized (the number of syntheses) is already known, it may be configured that the levels of the respective picked-up images are amplified (attenuated) by a reciprocal of the number of syntheses in advance and thereafter the attenuated picked-up images are synthesized. In this case, the image signal levels of the respective picked-up images can be lowered and there is an advantage that an exposure time is reduced. Besides, if the exposure time is too short, it is considered that a sufficient exposure for detecting the emphasis part cannot be obtained, and therefore it is determined whether the images should be attenuated after the synthesizing or the images before the synthesizing should be attenuated in accordance with the number of syntheses.

FIG. 16 shows a flow when performing the above exposure control. In Step S51 of FIG. 16, it is determined whether or not the compulsory panning photographing mode is designated. If the compulsory panning photographing mode is designated, it is determined whether or not the number of syntheses is selected (Step S52). If the number of syntheses is selected, the number (the number of syntheses) n is obtained in Step S53. Next, in Step 54, when an operation for starting the photographing is detected, the continuous photographing is started and the picked-up images by the continuous photographing are given to the temporary recording section 15a and recorded (Step S55).

In next Step S56, it is determined whether or not the number of syntheses has been designated. If the number of syntheses has not been designated, it is determined in Step S57 whether or not a user's operation for stopping the photographing is performed. Until the user's operation for stopping the photographing is performed, the processing of Step S58 is repeated. That is, the image pickup is performed by the continuous photographing with the appropriate exposure and the image synthesis and correction section 13e performs synthesis with the emphasis part overlapped and amplifies the synthetic image with the reciprocal of the number of syntheses, and then gives the synthetic image to the display control section 13a to be displayed.

Further, if it is determined in Step S56 that the number of syntheses has been designated, it is determined in Step S59 whether or not the number of photographing operations reaches the number of syntheses (n times). Until the number of photographing operations reaches n times, the processing of Step S60 is repeated. That is, the image pickup is performed by the continuous photographing with the exposure control being performed so that the exposure is 1/n of the appropriate exposure, and the image synthesis and correction section 13e performs synthesis with the emphasis part overlapped and gives the synthetic image to the temporary recording section 15a to be recorded, and to the display control section 13a to be displayed. When the continuous photographing is stopped, the synthetic image is recorded in the recording section 15.

As described, in the present embodiment also, the same effect as that in the foregoing embodiments is obtained. Further, the photographer designates a subject which the photographer likes to make conspicuous (emphasis part) and moves the apparatus to swing while performing the continuous photographing, and thereby the part designated as the emphasis part is overlapped and fixed each time when the photographing is performed so that the position of the part is not changed on the screen basically, and the photographer can dedicate himself or herself to confirmation of change of the background.

Besides, with respect to the "emphasis part", since whether being emphasized or not is expression dependent on sense, and rather specifically the emphasis is performed according to designation, it may be referred to as "designated part" or "specific part" so as to be rather objective expression.

Further, in the embodiments of the present invention, the description is given using a digital camera as the apparatus for photographing, but the camera may be a digital single-lens reflex camera or a compact digital camera, and a camera for moving images such as a video camera and a movie camera, and further may be a camera incorporated in a personal digital assistant (PDA) such as a mobile phone and a smart phone, as a matter of course. Furthermore, it may be an industrial or medical optical apparatus such as an endoscope and a microscope. With the above contrivance, it is made possible to provide an observation apparatus or a display apparatus with which a user can observe a desired image precisely even if the apparatus is not a photographing apparatus. In particular, displaying an image of the specific part with emphasis to the user is an important method or technique for correct recognition of an object in such an observation apparatus.

The present invention is not limited to the foregoing embodiments without change, and can be embodied by modifying the elements within a range not to be deviated from the gist of the invention in a stage of carrying out the invention. Further, various types of inventions may be formed by an appropriate combination of the plurality of elements disclosed in the foregoing embodiments. For example, some of all elements disclosed in the embodiments may be omitted. Furthermore, elements in the different embodiments may be appropriately combined.

Besides, even if the description is given by using "first", "next", etc. in the claims, the specification and the operation flows in the drawings, it does not mean that execution in this order is essential. Further, it is needless to say that the respective steps constituting the operation flow can be appropriately omitted with respect to a portion which does not affect the essence of the invention.

Furthermore, in the technique described above, most of the control and functions described mainly in the flowcharts can be set by programs, and the above-described control and functions can be realized by reading and executing the program by a computer. The all or part of the program can be stored, as a computer program product, in a portable medium such as a flexible disk, a CD-ROM, etc. and a nonvolatile memory, and a recording medium such as a hard disk and a volatile memory, and can be distributed or provided in the form of the portable medium or through a communication line when shipping the product. The user downloads the program through the communication line and installs the program in the computer or installs the program from the recording medium in the computer, and thereby the photographing apparatus of the present embodiment can be realized easily.

What is claimed is:

1. A photographing apparatus comprising:
    an image pickup unit that acquires a plurality of picked-up images by picking up images of a subject from mutually different viewpoints;
    an acquisition section that acquires a plurality of picked-up images by photographing a same target subject a plurality of times while the image pickup unit is moved with respect to the target subject so that a viewpoint of the image pickup unit varies with respect to the target subject;
    an image comparison section that sets a first region including a plurality of target subjects by synthesizing the plurality of images acquired by the acquisition section, generates a synthetic image by synthesizing the plurality of images acquired by the acquisition section such that image positions of the target subject coincide with each other and sets a second region including the target subject in the synthetic image, and sets a region not including the second region in the first region in the synthetic image as a region to be processed; and
    an image generating section that generates an image by processing the region set by the image comparison section in the synthetic image.

2. The photographing apparatus according to claim 1, wherein the region to be processed is a low contrast region in a periphery of the target subject included in the second region.

3. The photographing apparatus according to claim 1, wherein the image generating section starts generation of the image upon detection of movement of the image pickup unit.

4. The photographing apparatus according to claim 1, wherein the image pickup unit is moved in a substantially circular manner with respect to the target subject, and when the picked-up images picked up by the image pickup unit are synthesized in setting the first region, synthesis is performed such that the target subjects from the different viewpoints are arranged in a circular shape.

5. The photographing apparatus according to claim 1, wherein, when the target subject is a person, the image generating section performs processing such that the person is surrounded by a halo.

6. A photographing method comprising:
    picking up images of a same target subject from mutually different viewpoints so that a viewpoint of an image pickup unit varies with respect to the target subject;
    acquiring a plurality of picked-up images by photographing the target subject a plurality of times;
    setting a first region including a plurality of target subjects by synthesizing the acquired plurality of images;
    generating a synthetic image by synthesizing the acquired plurality of images such that image positions of the target subject coincide with each other and setting a second region including the target subject in the synthetic image;
    setting a region not including the second region in the first region in the synthetic image as a region to be processed;
    generating an image by processing the region set as the region to be processed in the synthetic image.

7. A non-transitory computer-readable recording medium recording a photographing control program for causing a computer to execute a process comprising:
    picking up images of a same target subject from mutually different viewpoints so that a viewpoint of an image pickup unit varies with respect to the target subject;
    acquiring a plurality of picked-up images by photographing the target subject a plurality of times;
    setting a first region including a plurality of target subjects by synthesizing the acquired plurality of images;
    generating a synthetic image by synthesizing the acquired plurality of images such that image positions of the target subject coincide with each other and setting a second region including the target subject in the synthetic image;
    setting a region not including the second region in the first region in the synthetic image as a region to be processed;
    generating an image by processing the region set as the region to be processed in the synthetic image.

8. A photographing apparatus including an image pickup unit, the photographing apparatus comprising:
    a mode setting section for setting an emphasis mode for performing emphasis processing for making a target subject conspicuous in a picked-up image;

an acquisition section that, when a same target subject is photographed a plurality of times while the image pickup unit is moved with respect to the target subject so that a viewpoint of the image pickup unit varies with respect to the same target subject in a state in which the emphasis mode is set, acquires a plurality of picked-up images including the target subject picked up from different viewpoints;

a first synthesizing section that generates a first synthetic image by synthesizing the plurality of images including images of the target subject picked up from the different viewpoints acquired by the acquisition section;

a region setting section that sets a region including a plurality of target subjects based on the first synthetic image synthesized by the first synthesizing section;

a second synthesizing section that generates a second synthetic image by synthesizing the plurality of images including the images of the target subject picked up from the different viewpoints acquired by the acquisition section such that image positions of the target subject coincide with each other;

a detecting section that obtains a boundary between the target subject synthesized to coincide in position and a low contrast part in the second synthetic image, and detects a region surrounded by the boundary and the region set by the region setting section, as a region to be processed; and an image generating section that generates an image in which the region in the second synthetic image detected by the detecting section is processed.

9. The photographing apparatus according to claim 8, wherein the image pickup unit is moved in a substantially circular manner with respect to the target subject, and the first synthesizing section synthesizes, when synthesizing the picked-up images picked up by the image pickup unit, such that the images of the target subject from the different viewpoints are arranged in a circular shape.

10. The photographing apparatus according to claim 8, wherein, when the target subject is a person, the image generating section performs processing such that the person is surrounded by a halo.

11. A photographing apparatus comprising:

an image pickup unit that picks up an image of a subject and outputs a picked-up image;

a display control section for displaying the picked-up image on a display section;

a touch panel disposed on the display section:

a setting section that detects, in response to an operation on the touch panel for designating an image part of the picked-up image displayed on the display section, one subject out of subjects included in the picked-up image as a target subject, and sets the one subject to be an emphasis region candidate;

a range setting section that sets, when the target subject is photographed in different positions within picked-up images by a plurality of image pickups from different viewpoints of the image pickup unit, one range including all of a plurality of image parts of the target subject included in a first synthetic image obtained by synthesizing the picked-up images;

a synthesizing section that obtains a second synthetic image by synthesizing a plurality of picked-up images used in image synthesizing of the first synthetic image such that image positions of the image parts of the target subject coincide with each other;

a region setting section that obtains a boundary between the image part of the target subject and another image part based on contrast of respective parts in the second synthetic image and sets the image part of the target subject which is detected as the emphasis region candidate to be an emphasis region, and sets a region other than the emphasis region in the range set by the range setting section to be a processing region; and an image generating section that generates an image in which the processing region in the second synthetic image is processed.

* * * * *